United States Patent [19]

Mukai et al.

[11] Patent Number: 5,433,910
[45] Date of Patent: Jul. 18, 1995

[54] METHOD OF PRODUCING MOLDING

[75] Inventors: Hiroshi Mukai; Yasunobu Teramoto; Takahiko Sato; Yoshihiro Inada, all of Inazawa, Japan

[73] Assignee: Toyoda Gosei Co., Ltd., Nishikasugai, Japan

[21] Appl. No.: 883,338

[22] Filed: May 14, 1992

[30] Foreign Application Priority Data

| May 14, 1991 | [JP] | Japan | 3-109426 |
| Jul. 30, 1991 | [JP] | Japan | 3-190384 |
| Mar. 13, 1992 | [JP] | Japan | 4-055725 |

[51] Int. Cl.⁶ .................................................. B29C 45/16
[52] U.S. Cl. ................................ 264/255; 264/328.12; 425/130
[58] Field of Search ............... 264/255, 328.8, 328.12, 264/294; 425/215, 572, 130, 588

[56] References Cited

U.S. PATENT DOCUMENTS

| 2,996,764 | 8/1961 | Ross et al. | 264/279.1 |
| 3,972,664 | 8/1976 | Fillman | 425/130 |
| 3,991,147 | 11/1976 | Knipp et al. | 264/328.12 |
| 4,208,368 | 6/1980 | Egli | 264/328.12 |
| 4,715,802 | 12/1987 | Arai | 264/328.8 |
| 4,734,027 | 3/1988 | Adams | 264/297.2 |
| 4,805,991 | 2/1989 | Arai et al. | 264/328.8 |
| 4,840,553 | 6/1989 | Arai | 264/328.8 |
| 4,966,744 | 10/1990 | Sorenson | 264/328.1 |
| 5,087,488 | 2/1992 | Cakmakci | 264/245 |

FOREIGN PATENT DOCUMENTS 2200543  8/1990  Japan .

OTHER PUBLICATIONS

Mukai et al Application No. 07/826,612 filed Jan. 28, 1992.

*Primary Examiner*—Jan H. Silbaugh
*Assistant Examiner*—Angela Ortiz
*Attorney, Agent, or Firm*—Cushman, Darby & Cushman

[57] ABSTRACT

A orifice passage for introducing excessive resin into a disposal tab forming cavity is provided at one end of a main cavity in a mold for sandwich molding. The section of the orifice passage is thinner in the central portion than in the opposite sides thereof. A thermoplastic elastomer for forming an outer layer of the molding is injected into the main cavity and then talc-containing polypropylene for forming the core of the molding is injected. The flow rate of the resins flowing through the orifice passage at this time becomes substantially uniform over the entirety of the section. Therefore, the talc-containing polypropylene sufficiently extends toward the opposite sides of the main cavity.

6 Claims, 6 Drawing Sheets

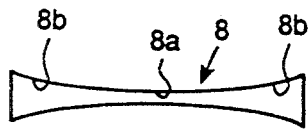
Fig. 13
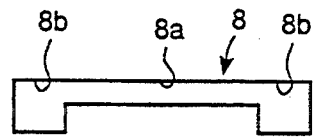
Fig. 14
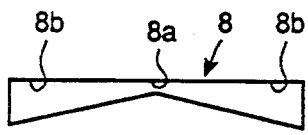
Fig. 15
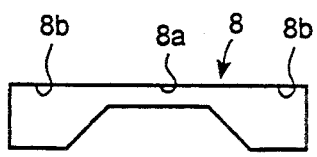
Fig. 16
Fig. 17
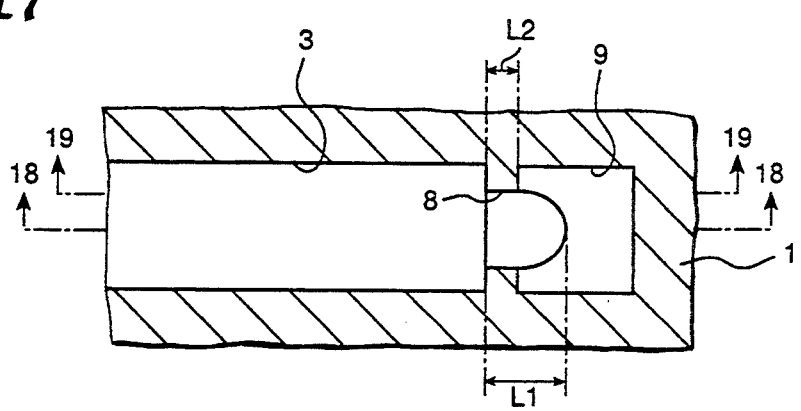
Fig. 18
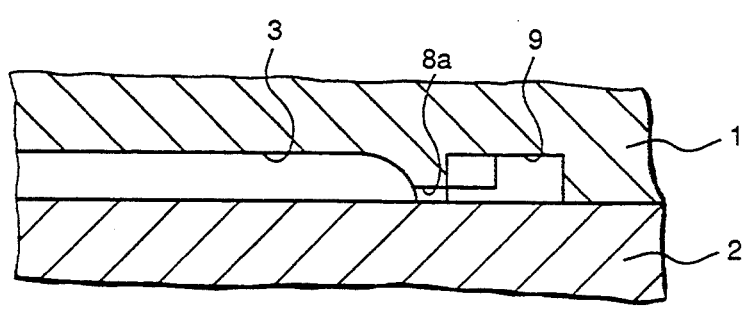

5,433,910

METHOD OF PRODUCING MOLDING

BACKGROUND OF THE INVENTION

Field of the Invention

The present invention relates to a molding method and mold and in particular to a method of and mold for producing an elongated molding comprising a core and an outer layer, which is mounted on the opposite sides of an automobile such as along the middle of the doors.

Description of Related Art

An elongated double layered molding comprising a core and an outer layer surrounding the core has heretofore been produced by the sandwich molding method. In this method, a mold is used so that the core extends to the vicinity of the sides of the molding. The mold as shown in FIG. 23 includes a fixed mold half 30 and a movable mold half 22, and a molding forming cavity 23 is formed between the mold halves 30 and 22. A disposal tab forming cavity 25 is communicated with one end of the cavity 23 (right side as viewed in the drawing) via an orifice 24. The section of the orifice passage 24 which is normal to the longitudinal direction of the molding (horizontal direction as viewed in FIG. 23) is elongated and rectangular in shape as shown in FIG. 24.

In order to produce a molding by using such a mold, a molten resin for forming an outer layer 26 is injected into the cavity 23 from one end (not shown in FIG. 22) of the cavity 23 and then a molten resin for forming the core 27 is injected into the, cavity 23. After these molten resins reach the opposite end of the cavity 23, some of the resins are introduced into the disposal tab forming cavity 25 via the orifice passage 24. A molding in which the core 27 extends to the vicinity of the sides of the mold can be obtained.

However, whenever a molding having a semi-cylindrical section including a thicker central portion and thinner side positions is molded, the molten resin for forming the core 27 mainly flows along the thick central portion of the cavity 23 and reaches the orifice passage 24. The orifice passage 24 is rectangular in section and the characteristics of the resin are substantially uniform over the entire section. Accordingly, the molten resin for forming the core 27 easily flows through the central portion as viewed in the width direction of the orifice 24 while the resin hardly flows along the periphery or side portions of the cavity 25. As a result of this, the obtained molding includes the core 27 which is tapered toward one end of the molding. Properties such as rigidity and shape retention provided by the core 27 can not be sufficiently exhibited at the end of the molding.

SUMMARY OF THE INVENTION

It is, therefore, an object of the present invention to provide a method of producing a molding which is capable of sufficiently exhibiting properties such as rigidity provided mainly by the core even at the ends of the molding.

In order to accomplish the above-mentioned object, the present invention provides a method of producing a molding including a core and an outer layer surrounding the core by using a mold having therein a main cavity for forming the molding, an excessive resin receiving cavity and an orifice passage which communicates the main cavity with the receiving cavity including the steps of: injecting a molten resin for forming the outer layer into the main cavity, then injecting a molten resin for forming the core, flowing both molten resins through the main cavity and then into the receiving cavity via the orifice passage and thereafter solidifying both molten resins in the mold. The orifice passage is formed so that the resistance of the orifice passage against the molten resins is smaller at the opposite side portions than at the central portion taken along the section normal to the resin flowing direction.

The section of the orifice passage which is normal to the flowing direction of the molten resins may be thicker at the opposite side portions thereof than at the central portion thereof.

The section of the orifice passage which is normal to the flowing direction of the molten resins gradually may increase from the central portion thereof to the opposite sides thereof in a width direction of the orifice passage.

The width of the orifice passage, which is normal to the flowing direction of the molten resins may be larger than that of the core of the molding to be molded.

The orifice passage may include a plurality of passages which are separated from each other and extend in the flowing direction of the molten resins, the total area of the section of the passage in the central portion being smaller than that of the section of the passages in each of the opposite side portions.

The length of the orifice passage in the central portion in the flowing direction of the molten resins may be larger than that in the opposite sides thereof.

The mold may be provided with a cavity forming a mounting boss so that the mounting boss forming cavity is communicated with the main cavity, and the core resin is also introduced into this mounting boss forming cavity.

The molten resin for forming the outer layer is firstly injected into the main cavity of the mold and then the molten resin for forming the core is injected into the main cavity. Both the molten resins flow into the excessive resin receiving cavity via the orifice passage after reaching the end of the main cavity. The resistance of the orifice passage against the flow of the core forming resin is lower in the opposite side portion in the width direction than in the central portion thereof.

The core forming molten resin passes the orifice passage at a sufficient width and flows into the excessive resin receiving cavity. In association with this, the core forming resin extends to the vicinity of the sides of the main cavity as viewed in a width direction of the main cavity even at the end of the main cavity.

In the molding which is obtained after the solidification of both molten resins, the core is not tapered and extends to the vicinity of the sides of the molding.

BRIEF DESCRIPTION OF THE DRAWINGS

FIGS. 13 to 16 are views showing the sections of the orifice passages of alternative embodiments;

FIG. 17 is a plan sectional view showing a further mold including an orifice passage having difference lengths;

FIG. 18 is a sectional view taken along the line 18—18 in FIG. 17;

DESCRIPTION OF THE EMBODIMENTS

First Embodiment

A first embodiment in which the method of producing a side molding of the present invention is embodied is now described with reference to FIGS. 1 to 6.

A side molding which is molded in accordance with the producing method of the present invention will be described. The side molding 4 comprises a central core 5 and an outer layer 6 which surrounds the core 5 so that the molding 4 is formed into a so-called sandwich structure. The core 5 is formed of polypropylene which contains talc (hereinafter referred to as talc-containing PP). The outer layer 6 is formed of thermoplastic elastomer (hereinafter referred to as TPE). In the present embodiment, the side molding 4 is generally semicyclindrical in shape so that it is thicker at the central portion as viewed in a width direction of the mold and is thinner at the opposite side edges thereof.

Figure 2:
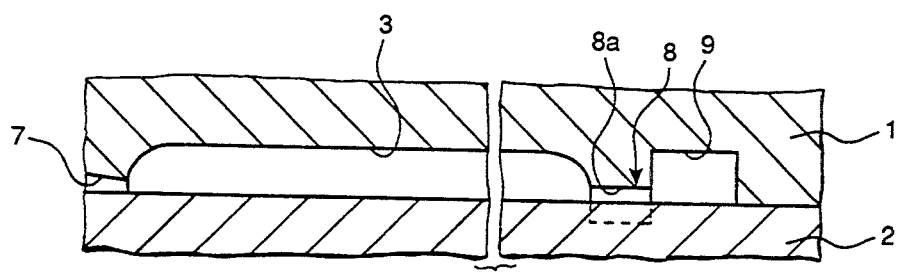
FIG. 2 is a front sectional view showing a first embodiment of a mold of the present invention.

A mold which is used for producing this embodiment will now be described. As shown in FIG. 2, the mold comprises an upper fixed mold half 1 which is positioned in the upper position in FIG. 2 and a lower movable mold half 2 which is positioned in the lower position in FIG. 2. An elongated cavity 3 for molding the side molding 4 therein is formed between the fixed and movable mold halves 1 and 2. The mold is formed with a gate 7 through which molten resins for forming the core 5 and the outer layer 6 are injected into the cavity 3. The gate 7 opens to the cavity 3 at one end thereof along the length of the side molding 4.

Figure 3:
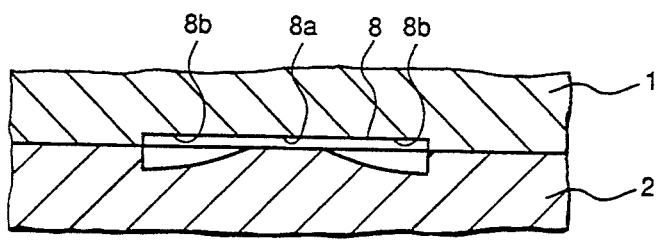
FIG. 3 is an elevational sectional view showing the configuration of an orifice passage in the mold.
Figure 4:
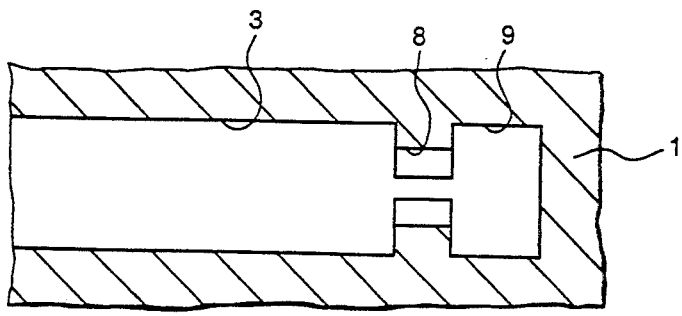
FIG. 4 is a plan sectional view showing the mold.

The mold is formed at the other end thereof with a disposal tab forming cavity 9 which is communicated with the main cavity 3 via an orifice passage 8 so that the disposal tab forming cavity 9 receives some of the excessive molten resin introduced into cavity 3. As shown in FIG. 3, the orifice passage 8 has a thickness of about 0.3 mm at the central portion 8a as viewed in a width direction and a thickness of about 1.0 mm at the opposite sides 8b thereof so that it is generally thinner at the central portion than the opposite sides thereof.

Figure 5:
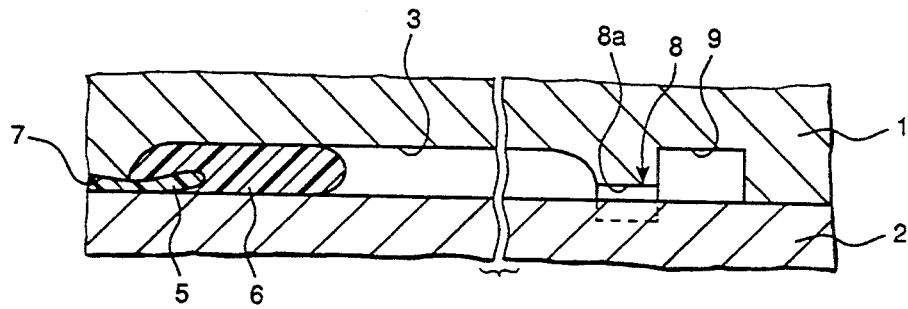
FIG. 5 is a front sectional view showing the condition in which resins are injected into the cavity of the mold.

Now, a method of producing a side molding 4 by using the thus formed mold is described. As shown in FIG. 5, after the molten TPE for forming the outer layer 6 is injected into the cavity 3 through the gate 7, the molten talc-containing PP for forming the core 5 is injected. Accordingly, TPE is caused to flow through the cavity 3 along the outer periphery thereof in a rightward direction as viewed in the drawing by being pressed by the talc-containing PP. After both the molten resins have reached the opposite end of the main cavity 3, the TPE enters into the disposal tab forming cavity 9 via the orifice passage 8, and subsequently the talc-containing PP enters into the disposal tab forming cavity 9 via the orifice passage 8.

Figure 6:
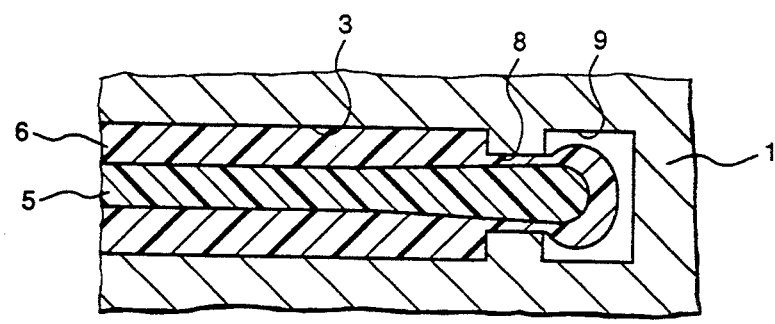
FIG. 6 is a plan section view showing a condition in which the resins in the cavity flow into a disposal tab forming cavity via the orifice passage.

Since the orifice passage 8 is formed thinner at the central portion 8a as viewed in the width direction than at the opposite sides 8b, the resistance of the passage 8 against both molten resins at the central portion 8a is higher than that at the opposite sides 8b. Accordingly, even when the thickness of the side molding 4 is thicker at the central portion, the talc-containing PP for forming core 5, flowing through the orifice passage 8, sufficiently flows through the opposite sides 8b of the orifice passage 8 as well as the central portion 8a thereof so that it is introduced into the disposal tab forming cavity 9. As a result of this, the width of the talc-containing PP for forming core 5 will gradually increase as it approaches the orifice passage 8 as shown in FIG. 6.

Figure 1:
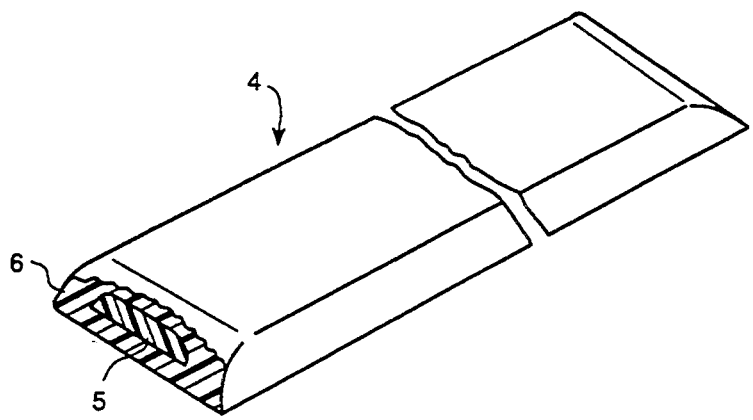
FIG. 1 is a perspective view showing a side molding.

After both molten resins are cooled and solidified, the side molding as shown in FIG. 1 can be formed by removing the movable mold half 2 from the fixed mold half 1. The thus formed side molding 4 does not have the core 5 which is tapered down at one end thereof, and has a sufficient width at one end thereof. Therefore, the side molding 4 positively also exhibits stability in dimension and warpage resistance due to rigidity possessed by the core 5 at the ends thereof.

Second Embodiment

A second embodiment of the present invention will be described with reference to FIGS. 7 and 8. Since the second embodiment is substantially identical with the first embodiment, only the structural differences from that of the first embodiment will be described for simplicity of the description. Like reference numerals denote like parts.

Figure 7:
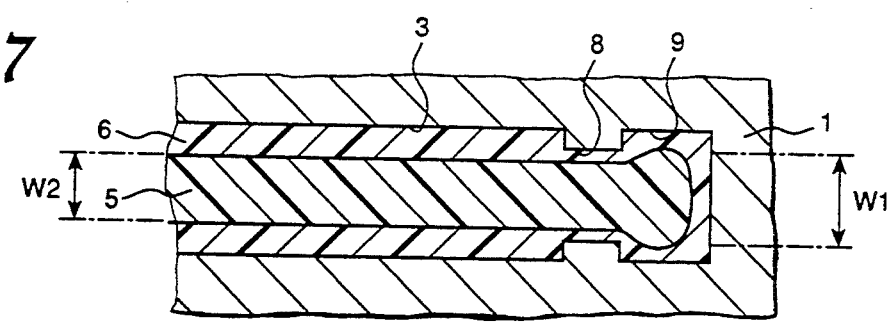
FIG. 7 is a plan section view showing a second embodiment of a mold.
Figure 8:
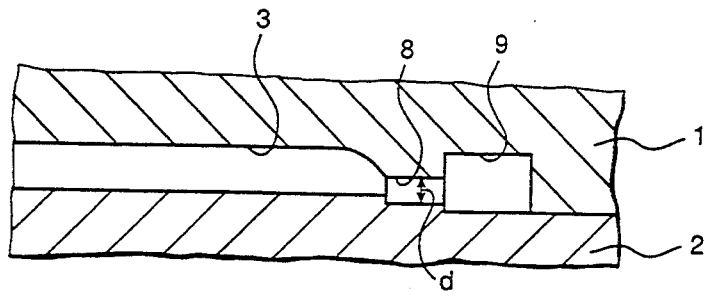
FIG. 8 is a front sectional view showing the mold.

In FIG. 7, the width W1 of the orifice passage 8 in the present embodiment is larger than the width W2 of the core 5 in the side molding 4 to be molded. The orifice passage 8 is preset to 1.0 mm in thickness d as shown in FIG. 8. It is preferable that the orifice passage be not thinner than 0.3 mm in thickness d. The side molding 4 and the core 5 are 4 mm and 3 mm in thickness, respectively. The bottom of the orifice passage 8 is formed in a level lower than that of the main cavity 3.

Also in this embodiment, the TPE for forming the outer layer 6 and then the talc-containing PP for forming the core 5 reach the orifice passage 8 similarly as in the first embodiment, the TPE and the talc-containing PP are successively introduced into the disposal tab forming cavity 9 via the orifice 8 in this order. Since the orifice passage 8 is formed to have a width W1 wider than that of the core 5, the talc-containing PP will generally smoothly pass through the orifice passage 8 at a sufficient width and substantially uniform flow rate.

Therefore, the core 5 of the thus formed side molding 4 has substantially the same width and thickness at the opposite ends in the longitudinal direction as those of the central portion in a longitudinal direction. Thus, the side molding 4 sufficiently has the above-mentioned properties possessed by this core 5.

Third Embodiment

A third embodiment of the present invention will be described with reference to FIG. 9. Since the present embodiment is substantially identical with the first embodiment, only the structural differences from that of the first embodiment will be described for simplicity of the description. Like reference numerals denote like parts.

Figure 9:
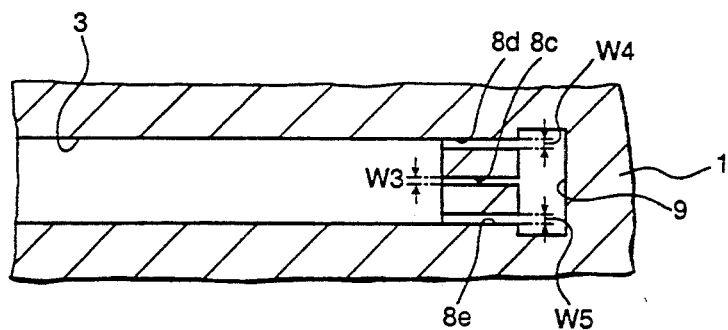
FIG. 9 is a plan sectional view showing a third. embodiment of a mold.

As shown in FIG. 9, the orifice passage 8 of the present embodiment comprises three passages such as a central passage 8c and side passages 8d and 8e. The width W3 of the central passage 8c is narrower than the widths W4 and W5 of the side passages 8d and 8e. Therefore, the area of the section of the central passage 8c which is normal to the flowing direction of the molten resins is smaller than the area of the sections of the side passages 8d and 8e.

Also, in this embodiment, when the TPE which forms the outer layer 6 and the talc-containing PP which forms the core 5 reach the orifice passage 8, they are successively introduced into the disposal tab forming cavity 9 via the orifice passage 8 in order of the TPE and the talc-containing PP. Since the orifice passage 8 comprises three passages 8c, 8d and 8e as mentioned above, and the sectional area of the central passage 8c is larger than those of the side passages 8d and 8e, the talc-containing PP sufficiently extends also to the vicinity of the side passages 8d and 8e and passes through each of the passages at a substantially uniform flow rate. Therefore, the core 5 of the thus formed side molding 4 has substantially the same width and thickness at both sides thereof as those at the central portion, and the side molding 4 also exhibits sufficient above-mentioned properties at both ends thereof owing to the core 5.

Figure 10:
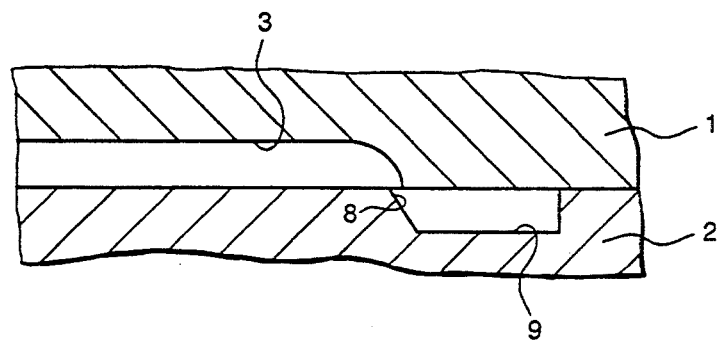
FIGS. 10 to 12 are front sectional views showing alternative embodiments of the mold.

The arrangement of the cavity 3, the orifice passage 8 and the disposal tab forming cavity 9 is not limited to only the arrangement of FIG. 1. As shown in FIG. 10, the disposal tab forming cavity 9 may be formed in the movable mold half 2 and the orifice passage 8 may be formed so that it extends from one end of the cavity 3 to a position which is oblique and below thereto.

Figure 11:
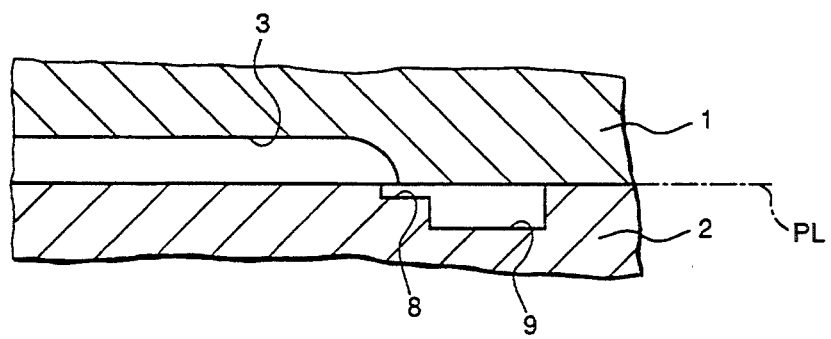

Alternatively, as shown in FIG. 11, the disposal tab forming cavity 9 may be formed in the movable mold half 2 and the orifice passage 8 may be formed so that it extends from the lower part of one end of the cavity 3 along a parting line PL.

Figure 12:
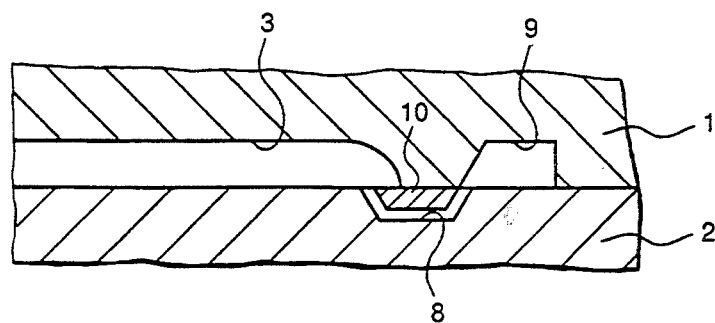

Further, as shown in FIG. 12, the disposal tab forming cavity 9 may be formed in the fixed mold half 1 and the orifice passage 8 may be formed so that it extends from one end of the cavity 3 in an oblique and downward direction, extends in a lateral direction and then extends in an oblique and upward direction. In this case, the portion which is surrounded by the orifice passage 8 forms a slide core 10.

Other than the section of the first embodiment, the orifice passage may have a convex-convex section which is gradually reduced in thickness from the opposite sides thereof to the central portion as shown in FIG. 13.

Alternatively, the orifice passage 8 may have an inverted U-shape as shown in FIG. 14.

Further, as shown in FIG. 15 the orifice passage 8 may be formed in such a manner that it has an inverted V-shaped bottom. Alternatively, the orifice passage 8 may have a trapezoidal projecting ridge on the bottom in the center thereof as shown in FIG. 16.

Figure 19:
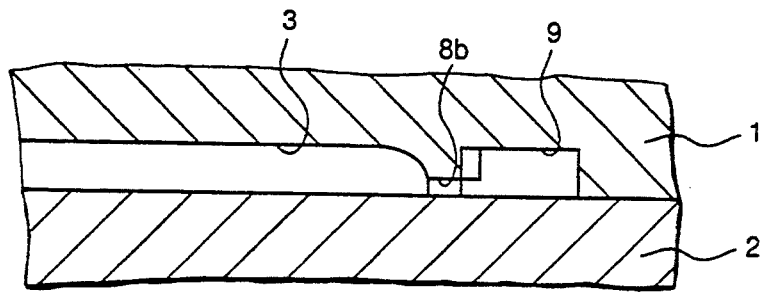
FIG. 19 is a sectional view taken along the line 19—19 in FIG. 17.

The orifice passage modification shown in FIGS. 17–19 includes the central portion 8a as viewed in a width direction of the mold having a length L1 which is longer than a length L2 of the opposite side portions 8b. By forming the mold in such a manner, the resistance of the orifice passage 8a against the resin is higher at the central portion 8a than that of the opposite side portions 8b so that the flow rate of the resin passing through the orifice passage can be made uniform over an entire section thereof.

Figure 20A:
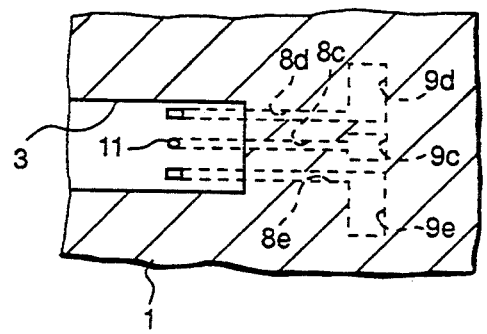
FIG. 20(a) is a partial plan sectional view showing an alternative mold.
Figure 20B:
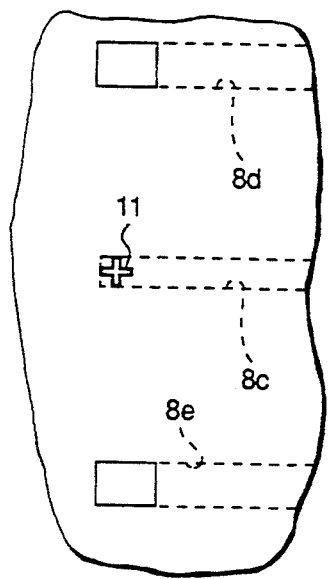
FIG. 20(b) is an enlarged view showing a passage for a boss.

Although the orifice passage 8 in FIGS. 20(a) and 20(b) has three passages including the central passage 8c and the side passages 8d and 8e, it may include four or more passages. Alternatively, the passages 8c to 8e may be formed below the cavity 3 in the movable mold half 2. The disposal tab cavity 9 may be separated into cavities 9d, 9c, 9e, corresponding to the passages 8d to 8c and 8e, respectively. In this case, instead of providing the central passage 8c having an area of the section normal to the flowing direction of the molten resin smaller than those of the side passages 8d and 8e, the volume of the disposal tab cavity 9 corresponding to the central passage 8c may be made smaller than that of each. of the disposal tab cavities 9d and 9e.

Figure 20C:
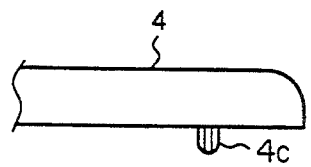
FIG. 20(c) is a partial elevational view showing a molding including a boss having a plus sign shaped section.
Figure 20D:
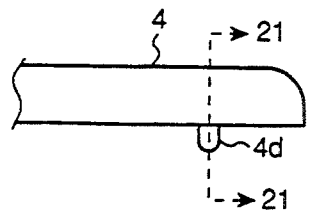
FIG. 20(d) is a partial elevational view showing a molding having a cylindrical boss.
Figure 21:
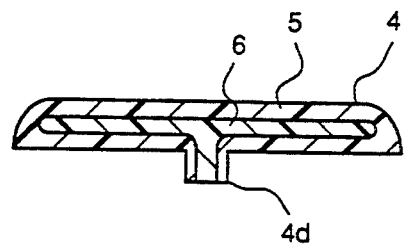
FIG. 21 is a sectional view taken along the line 21—21 in FIG. 20(d)
Figure 22:
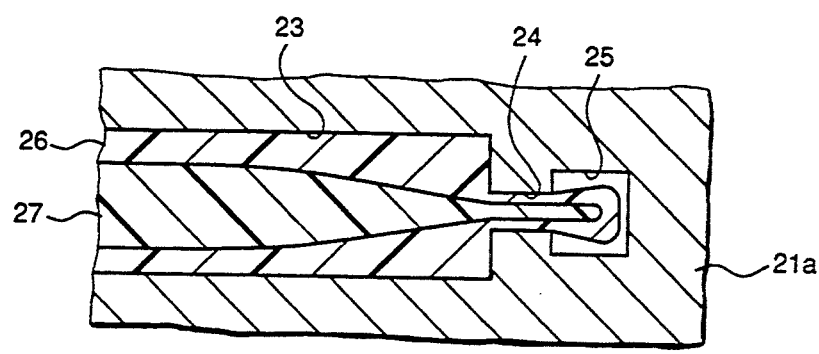
FIG. 22 is a plan sectional view showing a prior art mold.
Figure 23:
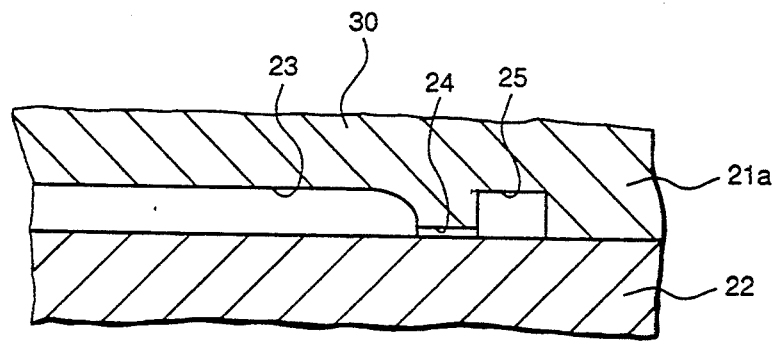
FIG. 23 is a front sectional view showing another prior art mold.
Figure 24:
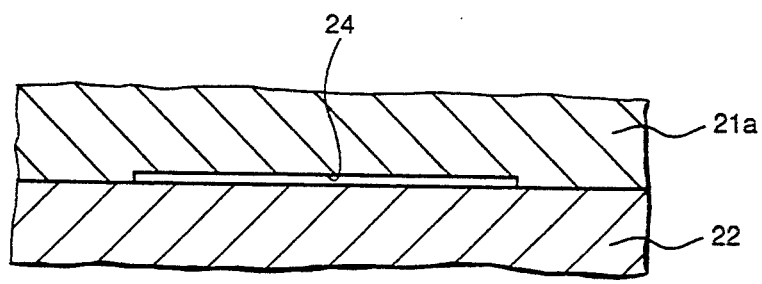
FIG. 24 is an elevational sectional view showing the shape of the orifice passage in the prior art mold.

A boss forming cavity 11 (FIGS. 20(a) and 20(b)) for forming a boss portion 4c (FIG. 20(c)) having a plus sign shaped section which is used to mount the side molding 4 on an automobile body may be formed at the entrance of the central passage. The boss is not limited to only the boss having a plus sign shaped section and the boss may be cylindrical in section as shown in FIGS. 20(d) and 21. In this case, the molding 4 including the boss having an increased rigidity as shown in FIG. 21 can be provided if the molten resin forming the core 5 is injected also into this boss forming cavity 11.

The method of producing a molding of the present invention can be applied for the production of a bumper molding, a side garnish and side spoiler as well as the side molding 4.

In accordance with the method of producing a molding of the present invention, the core will sufficiently extend toward the periphery of the mold at the end in the length of the mold so that the mold which sufficiently exhibits its excellent properties such as rigidity owing to the core can be easily produced.

It is to be understood that the present invention is not limited only to the foregoing embodiments and that modification and alteration are possible without departing from the scope and spirit of the present invention as defined by the following claims.

What is claimed:

1. A method of producing an injection molding having a core which is not tapered and on outer layer surrounding the core by using an injection mold having therein a main cavity for forming the injection molding, a tab forming cavity and an orifice passage which communicates said main cavity with said tab forming cavity, including the steps of:

injecting a first molten resin for forming the outer layer of said molding into said main cavity of said injection mold, then injecting a second molten resin into said main cavity for forming said core of said molding, flowing said first and second molten resins through said main cavity and then into said tab forming cavity through said orifice passage such that said core increases in width as it approaches said orifice passage, and therafter solidifying said first and second molten resins in the injection mold, said orifice passage being shaped so that a resistance of said orifice passage against the first and second molten resins is smaller at opposite side portions of said orifice passage that at a cental portion taken along a section normal to a resin flowing direction.

2. A method of producing an injection molding as defined in claim 1, in which the section of the orifice passage which is normal to the resin flowing direction is thicker at the opposite side portions thereof than at the central portion thereof.

3. A method of producing an injection molding as defined in claim 2, in which the section of the orifice passage which is normal to the resin flowing direction gradually increases from the central portion thereof to the opposite sides thereof in a width direction of the orifice passage.

4. A method of producing an injection molding as defined in claim 1, in which a width of the orifice passage, which is normal to the resin flowing direction, is larger than a widest portion of said core of the injection molding.

5. A method of producing an injection molding as defined in claim 1, in which said orifice passage comprises a plurality of passages which are separated from each other and extend in the resin flowing direction, a total area of the section of the passages in the central portion being smaller than that of the section of the passages in each of the opposite side portions.

6. A method of producing an injection molding as defined in claim 1, in which a length of the orifice passage in the central portion in the resin flowing direction is larger than that in the opposite sides thereof.

* * * * *